United States Patent [19]
Keuter

[11] Patent Number: 5,293,834
[45] Date of Patent: Mar. 15, 1994

[54] HOG FARROWING CRATE AND PEN

[75] Inventor: Dale H. Keuter, Earlville, Iowa

[73] Assignee: Eastern Iowa Pork Manufacturing, Inc., Earlville, Iowa

[21] Appl. No.: 995,707

[22] Filed: Dec. 21, 1992

[51] Int. Cl.[5] ............................................. A01K 1/02
[52] U.S. Cl. ...................................................... 119/20
[58] Field of Search ............................. 119/20, 27, 16

[56] References Cited

U.S. PATENT DOCUMENTS

| | | | |
|---|---|---|---|
| 2,764,127 | 9/1956 | Newman | 119/20 |
| 2,966,883 | 1/1961 | Lietzau | 119/20 |
| 3,105,462 | 10/1963 | Miller | 119/20 |
| 3,237,600 | 3/1966 | Behrens et al. | 119/20 |
| 3,412,711 | 11/1968 | Martensson et al. | 119/20 |
| 3,418,975 | 12/1968 | Smith | 119/20 |

FOREIGN PATENT DOCUMENTS

| | | | |
|---|---|---|---|
| 0360308 | 3/1990 | European Pat. Off. | 119/27 |
| 3124347 | 1/1983 | Fed. Rep. of Germany | 119/20 |
| 108616 | 1/1966 | Norway | 119/20 |
| 632326 | 11/1978 | U.S.S.R. | 119/20 |
| 1136771 | 1/1985 | U.S.S.R. | 119/27 |
| 2121665 | 1/1984 | United Kingdom | 119/20 |

*Primary Examiner*—Gene Mancene
*Assistant Examiner*—Todd E. Manahan
*Attorney, Agent, or Firm*—James C. Nemmers

[57] ABSTRACT

A hog farrowing crate and pen has side finger bars which are adjustable to vary the farrowing area. Adjustability is achieved by pivoting each of the side finger bars at one end of the crate with the opposite ends secured in a selected fixed position at the opposite end of the crate. Preferably, at least one of the side finger bars is straight while the other bar has a long straight portion and a shorter straight portion at an angle to the long portion. The swingable adjustment of the side finger bars provides for varying the size of the farrowing, pre-stall and creep areas during the stages of farrowing, post-farrowing and weaning.

4 Claims, 4 Drawing Sheets

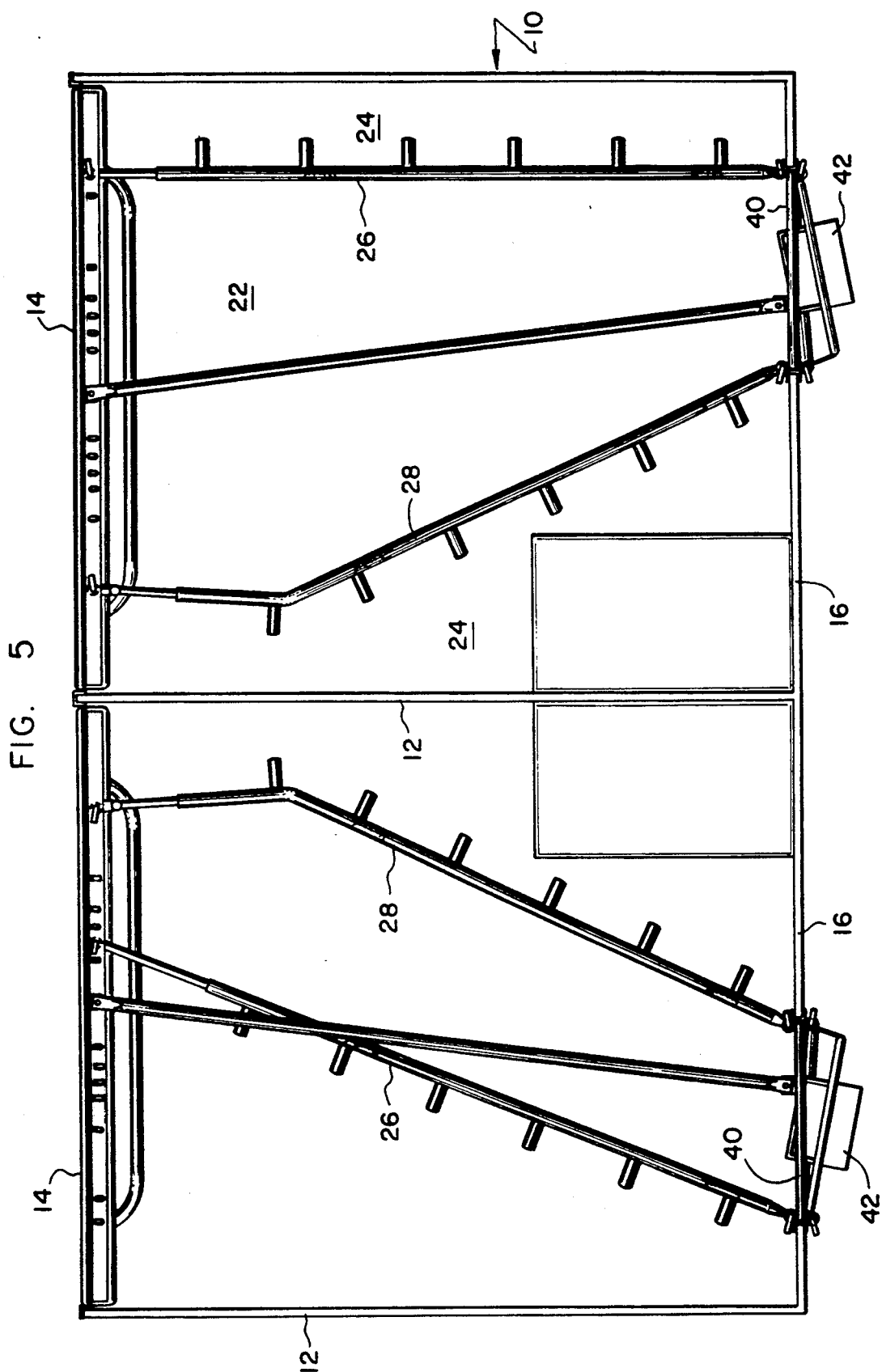

HOG FARROWING CRATE AND PEN

BACKGROUND OF THE INVENTION

Over the years, there have been numerous designs created to assist the breeders of hogs with farrowing and nursery management. Unless the farrowing and nursery management procedures are controlled, production of hogs can be adversely affected due to stress and disease during the farrowing stages. Also, it is not uncommon for baby pigs to be crushed by the sow when she lays down for feeding.

There have been created various farrowing crate and pen designs which divide an area of confinement into a farrowing area, a free stall area, and a creep area. These pens are designed to confine the sow in a farrowing area while still allowing the sow additional space in which to move around while providing creep areas for the baby pigs until they are weaned. Farrowing crates and pens of known designs include side finger bars which confine the sow with the finger bars allowing the baby pigs access to the farrowing area to feed. Farrowing pens of known design provide for adjustment of the side finger bars by allowing them to swing upwardly about a horizontal axis. This type of adjustment has worked satisfactorily and has allowed for introduction of the sow prior to farrowing with maximum space in the free stall area until signs of farrowing occur. The sow can then be confined in the farrowing area. However, with movement of the side finger bars limited to pivotal movement about a horizontal axis, expansion of the farrowing area during the post-farrowing period is very limited.

There is therefore a need for an improved farrowing pen and crate which allows for maximum adjustability in the areas within the crate without increasing the building space required. Any such adjustability should be simple and easy to accomplish and without adversely affecting in any way the various stages of farrowing and weaning.

SUMMARY OF THE INVENTION

The farrowing crate and pen of the invention has side finger bars each of which is pivoted at one end about a vertical axis, with the other end is swingable and securable in a selected fixed position to the end wall of the crate. Preferably, at least one of the side finger bars has a longer straight portion and a shorter straight portion at an angle to the longer portion. Depending upon the particular use and application, this configuration, especially with the angled side finger bar, provides for maximum utilization of the space within the pen and maximum adjustability of the farrowing and free stall and creep areas.

BRIEF DESCRIPTION OF THE DRAWING

FIG. 5 is a top or plan view of two adjacent crates of the invention.

DESCRIPTION OF THE PREFERRED EMBODIMENT OF THE INVENTION

Figure 4:
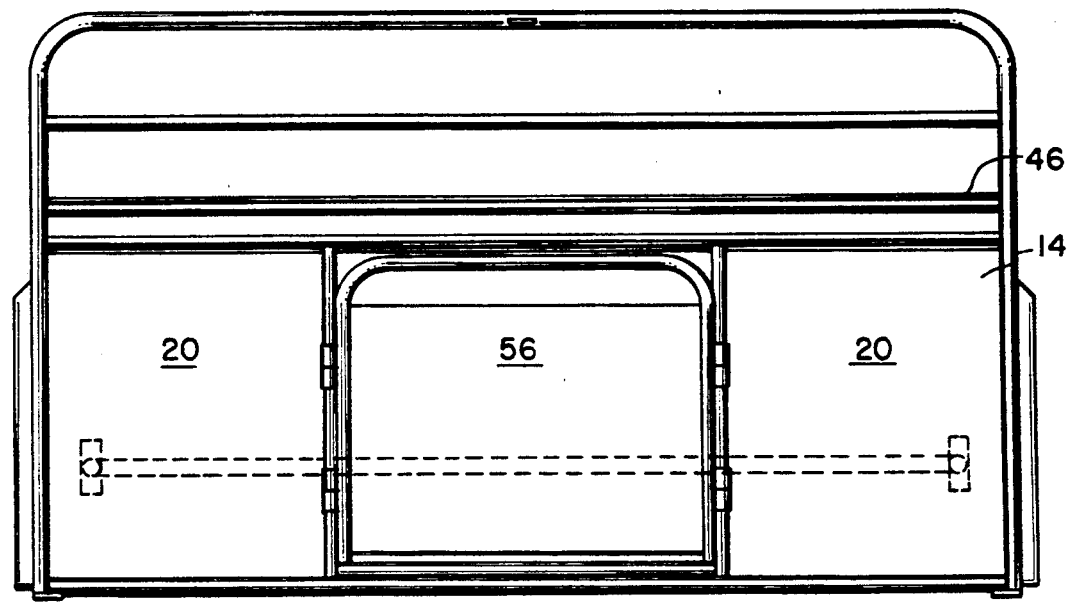
FIG. 4 is an end elevational view of the end of the farrowing crate opposite that shown in FIG. 3.

The farrowing crate of the invention has spaced apart side walls 10 and 12 that are vertically extending and substantially parallel to each other. Connected to the side walls 10 and 12 are end walls 14 and 16 which form a rectangular shaped crate of the desired dimensions. Side walls 10 and 12 and end walls 14 and 16 may be of any suitable construction, usually containing solid panels 18 along the side walls 10 and 12 and similar solid panels 20 that form the end walls 14 and 16. (See FIGS. 2, 3 and 4).

Figure 1:
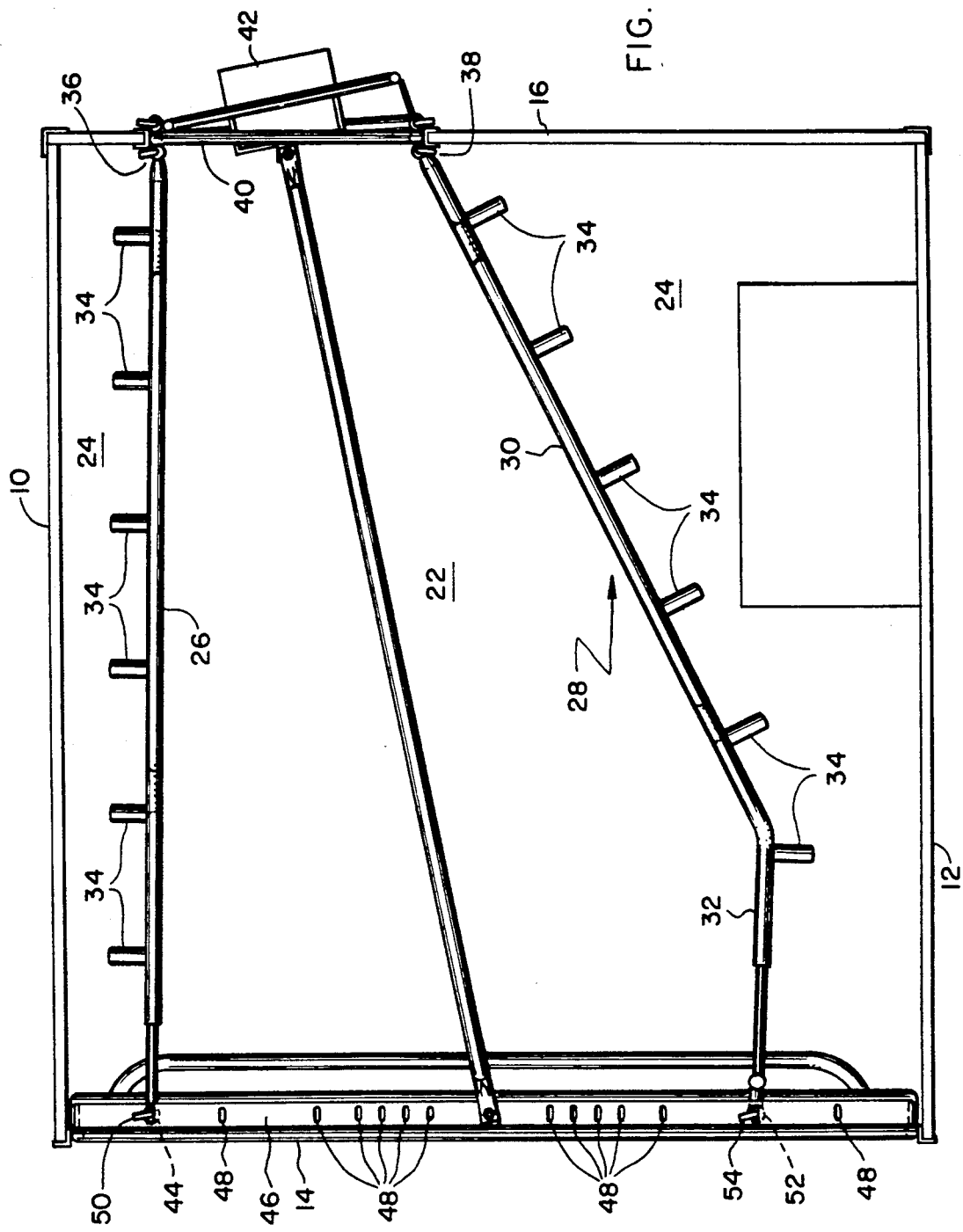
FIG. 1 is a top or plan view of a single farrowing crate or pen utilizing the principles of the invention.

The side walls 10 and 12 and end walls 14 and 16 define an enclosed space that is divided into a farrowing area 22 and creep areas 24. The farrowing area 22 and creep areas 24 are defined by two interior divider walls called side finger bars, one of which is a straight finger bar 26 and the other an angled finger bar 28 which has a longer straight portion 30 joined to a shorter straight portion 32 at an angle as best seen in FIG. 1. It should be understood that although the preferred embodiment of the invention shows one straight finger bar 26 and one angled finger bar 28, that both finger bars could be straight o could be of the angled type. Both the straight finger bar 26 and the angled finger bar 28 have downwardly extending fingers 34 that extend outwardly from the farrowing area 22, the fingers 34 being spaced apart a suitable distance to allow access of the baby pigs from the creep area 24 into the farrowing area 22.

At each end of both the straight finger bar 26 and the angle finger bar 28 is a pivotal connection with the end walls 14 and 16. At end wall 16, the pivotal connection 36 for the straight finger bar 26 and the pivotal connection 38 for the angled finger bar 28 are fixed pivots, one on each side of a removable panel 40 that contains a feeder 42. The feeder 42 is to permit the breeder to provide the desired feed to the sow prior to farrowing and during the farrowing stages.

The pivotal connection 36 for the straight finger bar 26 allows the finger bar 26 to be swung with the end 44 positioned and secured in a selected one of various openings in a fixed cross bar 46 that extends along the end wall 14. The cross bar 46 contains these openings 48 which will receive a removable pin 50 to secure the end 44 of the straight finger bar 26 in a selected one of the openings 48.

Similarly, the pivoted connection 38 of the angled finger bar 28 allows the bar 28 to be swung so that its opposite end 52 can be positioned in one of the selected openings 48 and secured there by a pivot pin 54. Thus, by swinging the straight finger bar 26 and the angled finger bar 28 to selected positions, the farrowing area 22 can be varied. In FIG. 5, there is illustrated two different and basic positions shown in two adjacent pens, the pens being identical except the pen on the right has the feeder panel 40 at the right end of the pen while the pen on the left has the feeder panel on the left. The pen shown on the left of FIG. 5 illustrates a farrowing area of the smallest common size while the pen on the right shows a farrowing area of the largest size. Obviously, other sizes in between the two illustrated in FIG. 5 can be utilized by moving the ends of the straight finger bars 26 and angled finger bars 28 to the desired positions.

Figure 2:
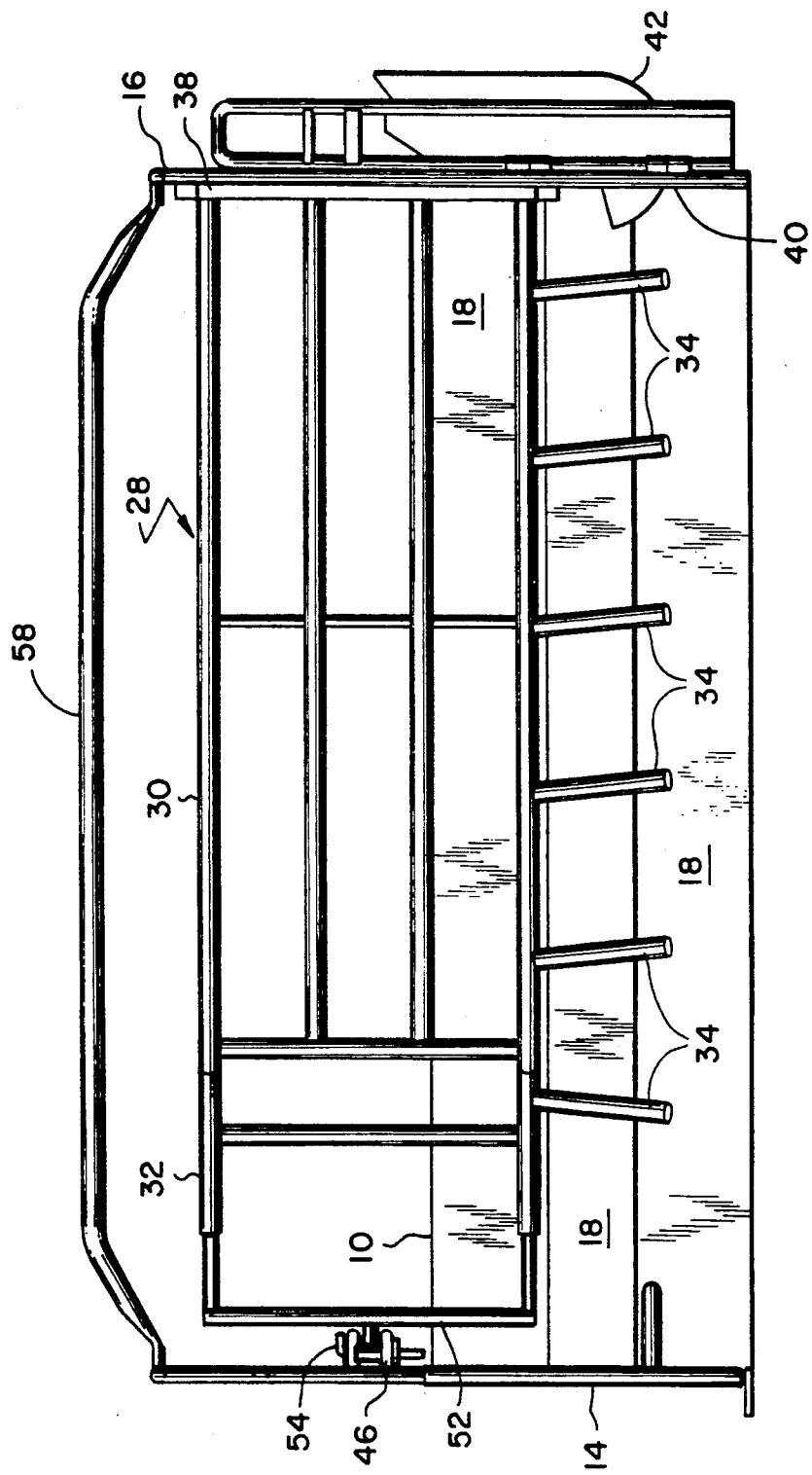
FIG. 2 is a side elevational view of the pen of FIG. 1 with one of the exterior walls of the pen removed to show the side finger bars.
Figure 3:
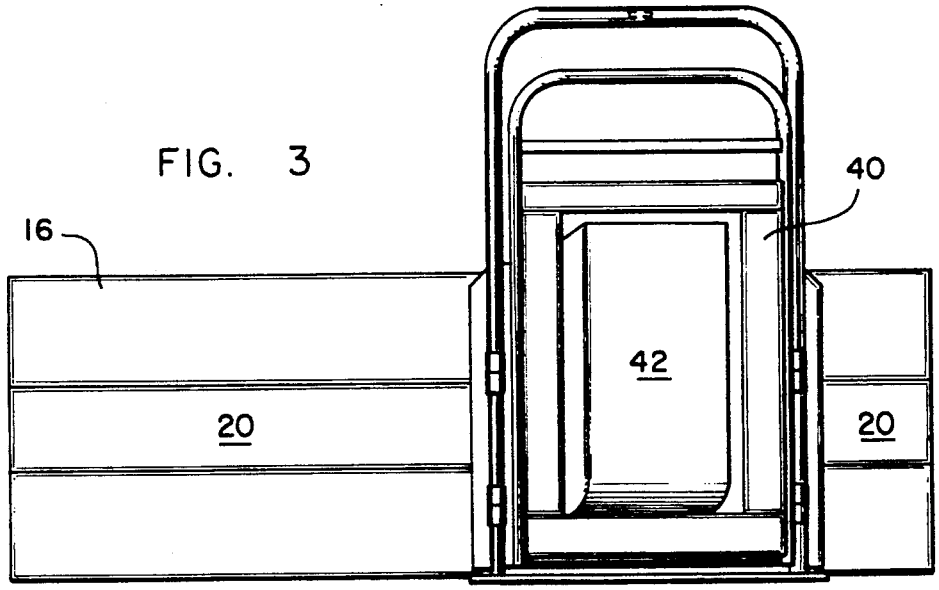
FIG. 3 is an end elevational view of the farrowing pen of the invention.

To complete the farrowing pen of the invention, the end wall 14 contains a gate 56 through which the sows can be allowed to enter and leave the farrowing crate. See FIG. 4. Also, as best seen in FIGS. 1 and 2, a cross support 58 extends over the top of the pen interconnecting the end walls 14 and 18 for structural rigidity.

The use of the farrowing crate of the invention should be evident to those skilled in the art from the foregoing description. However, its use is summarized as follows. The sow is introduced into the crate or pen through the gate 56 usually two to three days prior to farrowing. At this time, the straight finger bar 26 and the angled finger bar 28 are usually positioned as shown in the right pen of FIG. 5 to allow the sow maximum movement within the farrowing area which at this time is now a free area for the sow to move about, feed, and rest. When the sow shows signs of farrowing, or from the due date on, the farrowing area 22 can be narrowed by moving the straight finger bar 26 closer to the angled finger bar 28, or vice-versa. During farrowing and during the post-farrowing period, the sow is confined while the new baby pigs are allowed to move about in the creep area 24. When pens are adjacent as illustrated in FIG. 5, two adjacent litters can be allowed to co-mingled if desired by removal of some of the panels 18.

By use of the combination of an angled finger bar 28 with a straight finger bar 26, the maximum area can be provided to the sow during the pre-farrowing stage. The sows thus stay healthier and more content when they can move around. This is accomplished without increasing the size of the pen itself, thus providing for more crates in a given building space. The adjustability of the finger bars 26 and 28 can be varied by the breeder depending on the sow's stage of lactation. It should be understood that in some instances, the crate may be designed with both finger bars of the angled type and with such designs, the feeder panel 40 is preferably centered in the end wall 16. It will be understood by those skilled in the art that various other revisions an modifications can be made in the specific design of the preferred embodiment illustrated herein without departing from the spirit and scope of the invention. It is my intention, however, that all such revisions and modifications as are obvious to those skilled in the art will be included within the scope of the following claims.

What is claimed is as follows:

1. A farrowing stall for pigs comprising spaced-apart side walls, first and second end walls joined to the side walls to form a generally rectangular enclosure, a gate in one of the end walls to provide access to the enclosure, spaced-apart first and second side finger bars within the enclosure and dividing the enclosure into a farrowing area and at least one creep area, each of the side finger bars having a first end and a second end, the first side finger bar being substantially straight from the first end to the second end, and the second side finger bar having a first straight portion joined between its ends to a second straight portion at an angle to form an angled finger bar, the first end of each of the finger bars being pivotally mounted on a single fixed pivot on the first end wall, the second end wall having a plurality of pivot mounts along the wall with the second end of each of the finger bars being securable to a selected one of the pivot mounts, the first and second ends being pivotally mounted on the end walls to provide for swingable movement of the side finger bars relative to each other and relative to the side walls so as to selectively vary the relative sizes of the farrowing and creep areas, and fastening means for securing the side finger bars in selected positions on the end walls.

2. The farrowing stall of claim 1 in which the second straight portion of the angled finger bar is angled toward the first finger bar.

3. The farrowing stall of claim 2 in which the first straight portion of the angled finger bar is substantially longer than the second portion, and the end of the first straight portion is connected to the fixed pivot on the first end wall.

4. The farrowing stall of claim 3 in which the gate is in the second end wall.

* * * * *